United States Patent
Petrescu

(10) Patent No.: US 6,993,191 B2
(45) Date of Patent: Jan. 31, 2006

(54) METHODS AND APPARATUS FOR REMOVING COMPRESSION ARTIFACTS IN VIDEO SEQUENCES

(75) Inventor: Doina Petrescu, Chapel Hill, NC (US)

(73) Assignee: PTS Corporation, San Jose, CA (US)

( * ) Notice: Subject to any disclaimer, the term of this patent is extended or adjusted under 35 U.S.C. 154(b) by 575 days.

(21) Appl. No.: 10/136,651

(22) Filed: May 1, 2002

(65) Prior Publication Data

US 2003/0020835 A1 Jan. 30, 2003

Related U.S. Application Data

(60) Provisional application No. 60/288,965, filed on May 4, 2001.

(51) Int. Cl.
*G06K 9/56* (2006.01)
(52) U.S. Cl. .................. 382/205; 382/264; 382/275; 382/276; 382/304; 382/266; 348/607
(58) Field of Classification Search ............... 382/205, 382/304, 264, 266, 275, 268; 348/445, 607, 348/246, 614, 616
See application file for complete search history.

(56) References Cited

U.S. PATENT DOCUMENTS

| | | | | |
|---|---|---|---|---|
| 4,797,740 A | * | 1/1989 | Harasaki et al. ....... | 375/240.24 |
| 5,475,421 A | * | 12/1995 | Palmer et al. .......... | 348/14.1 |
| 5,659,626 A | * | 8/1997 | Ort et al. .............. | 382/125 |
| 5,748,796 A | * | 5/1998 | Pennino et al. ........ | 382/254 |
| 5,802,218 A | * | 9/1998 | Brailean ................ | 382/275 |
| 5,850,294 A | * | 12/1998 | Apostolopoulos et al. ............ | 358/426.14 |
| 5,974,197 A | * | 10/1999 | Lee et al. .............. | 382/268 |
| 6,188,799 B1 | * | 2/2001 | Tan et al. .............. | 382/260 |
| 6,226,050 B1 | * | 5/2001 | Lee ...................... | 348/607 |
| 6,574,374 B1 | * | 6/2003 | Acharya ................ | 382/257 |
| 6,643,395 B1 | * | 11/2003 | Okabe .................. | 382/149 |
| 6,665,447 B1 | * | 12/2003 | Chan .................... | 382/254 |
| 6,674,906 B1 | * | 1/2004 | Han et al. .............. | 382/199 |
| 6,807,317 B2 | * | 10/2004 | Mathew et al. ........ | 382/266 |
| 2003/0219073 A1 | * | 11/2003 | Lee et al. .............. | 375/240.27 |

OTHER PUBLICATIONS

Petrescu, IEEE Publication, May 2001, "Efficient implementation of video post-processing algorithms on the BOPs parallel architecture". (pp. 945-948).*

* cited by examiner

*Primary Examiner*—Kanjibhai Patel
*Assistant Examiner*—Manav Seth
(74) *Attorney, Agent, or Firm*—Priest & Goldstein, PLLC

(57) ABSTRACT

Techniques for removing ringing artifacts from video data. A deringing filter in accordance with the present invention preserves real image edges in a video frame, while smoothing out the interiors of objects. In one aspect, a 9-tap low-pass filter is applied to an adaptive processing window. The filter window is initialized with the values in a 3×3 mask centered on the position whose output is computed. Then all values that are very different from the central one are replaced with the central value. The deringing filter varies between 3×3 low-pass and identity, depending on how much the central value differs from its surrounding ones. A deblocking filter in accordance may also be suitably used in conjunction with the deringing filter.

24 Claims, 8 Drawing Sheets

FIG. 3

CALCULATE FILTER INPUT VECTOR
$v = [v_0 \ v_1 \ldots v_8]$ $$v_0 = \begin{cases} x_{i-1,j-1}, & |x_{i-1,j-1} - x_{i,j}| \leq QP \\ x_{i,j}, & \text{OTHERWISE} \end{cases}$$

$$v_1 = \begin{cases} x_{i-1,j}, & |x_{i-1,j} - x_{i,j}| \leq QP \\ x_{i,j}, & \text{OTHERWISE} \end{cases}$$

$$v_2 = \begin{cases} x_{i-1,j+1}, & |x_{i-1,j+1} - x_{i,j}| \leq QP \\ x_{i,j}, & \text{OTHERWISE} \end{cases}$$

$$v_3 = \begin{cases} x_{i,j-1}, & |x_{i,j-1} - x_{i,j}| \leq QP \\ x_{i,j}, & \text{OTHERWISE} \end{cases}$$

$$v_4 = x_{i,j}$$

$$v_5 = \begin{cases} x_{i,j+1}, & |x_{i,j+1} - x_{i,j}| \leq QP \\ x_{i,j}, & \text{OTHERWISE} \end{cases}$$

$$v_6 = \begin{cases} x_{i+1,j-1}, & |x_{i+1,j-1} - x_{i,j}| \leq QP \\ x_{i,j}, & \text{OTHERWISE} \end{cases}$$

$$v_7 = \begin{cases} x_{i+1,j}, & |x_{i+1,j} - x_{i,j}| \leq QP \\ x_{i,j}, & \text{OTHERWISE} \end{cases}$$

$$v_8 = \begin{cases} x_{i+1,j+1}, & |x_{i+1,j+1} - x_{i,j}| \leq QP \\ x_{i,j}, & \text{OTHERWISE} \end{cases}$$

CALCULATE THE OUTPUT USING THE COEFFICIENTS
$C = [1 \ 2 \ 1 \ 2 \ 4 \ 2 \ 1 \ 2 \ 1]$ $$y_{i,j} = \left(\sum_{k=0}^{8} v_k \cdot c_k + 8\right) / 16$$

FIG. 4

| SJ | LU | ALU | MAU | DSU |
|---|---|---|---|---|
| | lbd.p.b0 R30,A1,DX+16 | absdif.pa.8ub R14,R4,R24 | | |
| | | | | copys.pd.8b R12,R4,R6 |
| | | cmpkS.pa.8b R14,R8 | | shl1.pd.1d R26,R6,8 |
| | lbd.p.b0 R26,A1,2*DX+15 | absdif.pa.8ub R16,R4,R30 | | rotri.pd.1d R30,R30,8 |
| | lbd.p.b0 R28,A1,8 | cmpkS.pa.8b R16,R8 | mean2.pa.8ub R28,R2,R2,r-trunc | R14,R4,R24 |
| | lbd.p.b0 R22,A1,2*DX+24 | absdif.pa.8ub R18,R4,R26 | mean2.pa.8ub R22,R6,R6,r-trunc | unpack.pd.4b.z R6,R4 |
| | | cmpkS.pa.8b R18,R8 | | copys.pd.8b R16,R4,R30 |
| | | absdif.pa.8ub R20,R4,R22 | | rotri.pd.1d R22,R22,8 |
| | ld.p.d R2,Int4.2 | | | copys.pd.8b R18,R4,R26 |
| | | | | shl1.pd.1d R26,R2,8 |
| | | cmpkS.pa.8b R20,R8 | mpyl.pm.4uh R6,R6,R2 | rotri.pd.1d R28,R28,8 |
| | lli.p.b0 R26,-A1,1 | absdif.pa.8ub R22,R4,R28 | | copys.pd.8b R20,R4,R22 |
| | | cmpkS.pa.8b R22,R8 | addi.pm.4h R6,R6,4 | unpack.pd.4b.z R30,R10 |
| | | absdif.pa.8ub R24,R4,R26 | add.pm.4h R28,R30,R6 | copys.pd.8b R22,R4,R28 |
| | | cmpkS.pa.8b R24,R8 | | unpack.pd.4b.z R30,R12 |
| | | add.pa.4h R28,R30,R28 | | copys.pd.8b R24,R4,R26 |
| | llm.p.w R1,9 | add.pa.4h R28,R30,R28 | | unpack.pd.4b.z R30,R14 |
| | | | mpyl.pm.4uh R6,R28,R2 | unpack.pd.4b.z R0,R20 |
| | adda.p.wA1,A1,R1 | add.pa.4h R28,R30,R0 | | unpack.pd.4b.z R30,R22 |
| | | add.pa.4h R28,R30,R28 | | unpack.pd.4b.z R30,R24 |
| | | add.pa.4h R28,R30,R28 | | unpack.pd.4b.z R26,R5 |
| | | add.pa.4h R28,R30,R6 | mpyl.pm.4uh R6,R26,R2 | unpack.pd.4b.z R26,R11 |
| | ld.p.w R1,OP_tog | add.pa.4h R26,R30,R26 | addi.pm.4h R6,R6,4 | unpack.pd.4b.z R30,R13 |
| | llm.p.w R0,1 | add.pa.4h R26,R30,R26 | | unpack.pd.4b.z R30,R15 |
| | ll.p.b0 R8,A3+,R1 | add.pa.4h R26,R6,R26 | sub.pm.1w R1,R0,R1 | unpack.pd.4b.z R4,R19 |
| | | add.pa.4h R26,R30,R4 | mpyl.pm.4uh R6,R26,R2 | unpack.pd.4b.z R30,R21 |
| sd.p.w R1,OP_tog | lli.p.d R2,A1,0 | add.pa.4h R26,R30,R26 | | unpack.pd.4b.z R30,R23 |
| | lbd.p.d R4,A1,DX*8 | add.pa.4h R26,R30,R26 | sub.pm.1w R9,R9,R9 | unpack.pd.4b.z R30,R25 |
| | lbd.p.d R6,A1,2*(DX+8) | absdif.pa.8ub R10,R4,R2 | add.pm.4h R26,R26,R6 | shri.pd.4uh R28,R28,4 |
| | | | | perm.pd.8b R6,R8,R9 |
| | | cmpkS.pa.8b R10,R8 | | shl1.pd.1d R24,R4,8 |
| | | absdif.pa.8ub R12,R4,R6 | | shri.pd.4uh R26,R26,4 |
| sli.p.d R30,A2+,1 | lbd.p.b0 R24,A1,DX+7 | cmpkS.pa.8abb R12,R8 | mean2.pa.8ub R30,R4,R4,r-trunc | pack1.pd.8b R30,R26,R28 |
| | | | | copys.pd.8b R10,R4,R2 |

FIG. 5

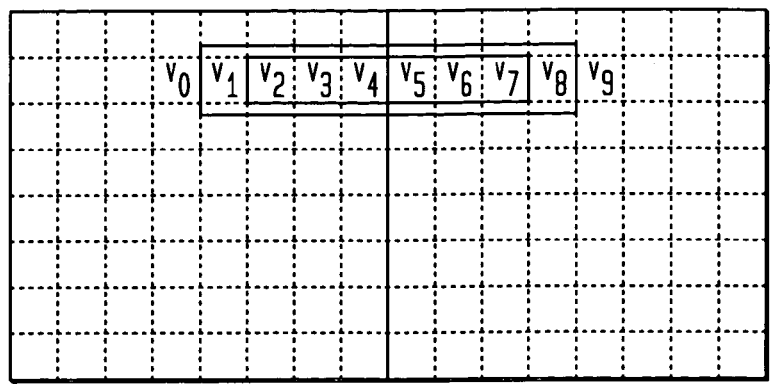

BLOCK j — DECISION WINDOW
BLOCK j+1 — FILTERED PIXELS

FIG. 6

FEATURES:
$$v = [v_1\ v_2 \ldots v_8]$$
$$max = MAX(v)$$
$$min = MIN(v)$$
$$F(v) = \sum_{i=0}^{8} \varphi(v_i - v_{i+1}),$$
$$\varphi(\Delta) = \begin{cases} 1, & |\Delta| \leq Thr_1 \\ 0, & OTHERWISE \end{cases}$$
$$d = |v_4 - v_5|$$

DECISION:

$F(v) \geq Thr_2$ ?

- YES → MAX−MIN < 2·QP ?
  - YES → STRONG SMOOTHING FILTER $v_2 \ldots v_7$ LPF 7 (1,1,1,2,1,1,1)
  - NO → NO FILTER
- NO → d < QP ?
  - NO → NO FILTER
  - YES → WEAK FILTER FILTER ONLY $v_4, v_5$
    $$v_4' = v_5' = \frac{v_4 + v_5}{2}$$

FIG. 7

| SU | LU | ALU | MAU | |
|---|---|---|---|---|
| LOOP | | | | |
| slu.p.b0 R4,A2+,R1 | lll.p.b0 R2,A1+,9 | cmpiL.pa.8b R8,L6,THR1 | | copy.pd.b R18b0,R8b3 |
| | ld.p.w R10,OP_inc | absdif.pa.8ub R8,R2,R4 | | |
| | ld.p.w R11,OP_top | cmpiL.pa.8b R8,L6,THR1 | sub.pm.1w R13,R13,R13 | copy.pd.w R14,SCR0 |
| | llu.p.b0 R0,A5+,R10 | cntmsk.pa.1w R13,R12,R14 | sub.pm.1w R10,R11,R10 | |
| | | T.addi.pa.1w R13,R13,1 | | rotll.pd.1d R8,R4,16 |
| sd.p.w R10,OP_inc | | max.pa.8ub R16,R8,R4 | | shli.pd.1w R10,R0,1 |
| | | min.pa.8ub R14,R8,R4 | | |
| | | max.pa.4ub R16,R16,R17 | | |
| | | min.pa.4ub R14,R14,R15 | | rotll.pd.1w R17,R16,8 |
| | | max.pa.4ub R16,R16,R17 | | rotll.pd.1w R15,R14,8 |
| | | min.pa.4ub R14,R14,R15 | | |
| | | absdif.pa.8ub R16,R14,R16 | | |
| | llm.p.w A6,coeffs | cmpiHS.pa.1w R13,L6,THR2 | | |
| | llm.p.w R20,0 | cmpLO.AND.pa.4b R16,R10 | | |
| | ld.p.d R28,Int4 | cmpiLO.pa.1w R13,L6,THR2 | | |
| | T.llm.p.w R20,2 | cmpLO.AND.pa.1w R18,R0 | | |
| | | or.pa.1d R24,R28,R28 | | |
| | T.llm.p.w R20,1 | or.pa.1d R16,R28,R28 | | unpack.pd.4b.z R22,R3 |
| | | or.pa.1d R8,R28,R28 | | |
| | ltbl.p.w A6,A6,+R20 | or.pa.1d R20,R28,R28 | | unpack.pd.4b.z R2,R2 |
| | lll.p.d R12,A6+,1 | | | |
| | lll.p.d R14,A6+,1 | | sum2pa.pm.4sh R16,R12,R2 | |
| | lll.p.d R12,A6+,1 | | sum2p.pm.4sh R18,R14,R22 | |
| | lll.p.d R14,A6+,1 | | sum2pa.pm.4sh R20,R12,R2 | unpack.pd.4b.z R10,R5 |
| | lll.p.d R12,A6+,1 | add.pa.2w R16,R16,R18 | sum2p.pm.4sh R22,R14,R22 | unpack.pd.4b.z R4,R4 |
| | lll.p.d R14,A6+,1 | add.pa.1w R16,R16,R17 | sum2pa.pm.4sh R24,R12,R4 | unpack.pd.4b.z R30,R7 |
| | lll.p.d R12,A6+,1 | add.pa.2w R20,R20,R22 | sum2p.pm.4sh R26,R14,R10 | shri.pd.1uw R16,R16,3 |
| slu.p.b0 R16,A2+,R1 | lll.p.d R14,A6+,1 | add.pa.1w R20,R20,R21 | sum2pa.pm.4sh R28,R12,R4 | unpack.pd.4b.z R6,R6 |
| | lll.p.d R12,A6+,1 | add.pa.2w R24,R24,R26 | sum2p.pm.4sh R18,R14,R10 | shri.pd.1uw R20,R20,3 |
| slu.p.b0 R20,A2+,R1 | lll.p.d R14,A6+,1 | add.pa.1w R24,R24,R25 | sum2pa.pm.4sh R8,R12,R6 | copy.pd.d R22,R8 |
| | lll.p.d R12,A6+,1 | add.pa.2w R28,R28,R18 | sum2p.pm.4sh R20,R14,R30 | shri.pd.1uw R24,R24,3 |
| slu.p.b0 R24,A2+,R1 | lll.p.d R14,A6+,1 | add.pa.1w R28,R28,R29 | sum2pa.pm.4sh R22,R12,R6 | copy.pd.w R26,R31 |
| | | add.pa.2w R20,R20,R8 | sum2p.pm.4sh R24,R14,R30 | shri.pd.1uw R28,R28,3 |
| slu.p.b0 R28,A2+,R1 | | add.pa.1w R20,R20,R21 | | |
| | lll.p.d R6,A1+,1 | add.pa.2w R24,R24,R22 | | shri.pd.1uw R20,R20,3 |
| slu.p.b0 R20,A2+,R1 | lll.p.d R7,A1+,1 | add.pa.1w R24,R24,R25 | | |
| | lll.p.b0 R6,A1-,9 | or.pa.1d R4,R6,R6 | | shri.pd.1uw R24,R24,3 |
| slu.p.b0 R24,A2+,R1 | llm.p.w R18,0 | | | rotri.pd.1d R6,R6,8 |
| slu.p.b0 R26,A2+,R1 | llm.p.w R12,0xff | absdif.pa.8ub R8,R6,R4 | | shli.pd.1d R2,R4,8 |

DECISION

FILTERING

METHODS AND APPARATUS FOR REMOVING COMPRESSION ARTIFACTS IN VIDEO SEQUENCES

The present application claims the benefit of U.S. Provisional Application Ser. No. 60/288,965 filed May 4, 2001, and entitled "Methods and Apparatus for Removing Compression Artifacts in Video Sequences" which is incorporated herein by reference in its entirety.

FIELD OF THE INVENTION

The present invention relates generally to improvements in video processing. More specifically, the present invention relates to filters which provide for improved visual quality in video decoding.

BACKGROUND OF THE INVENTION

In low bit rate video coding, the quantization of discrete cosine transform (DCT) coefficients produces well known artifacts in decoded images. The best known artifacts are the blocking effect and the ringing effect. Signal adaptive filters are generally used to remove these artifacts, while preserving details which belong to the image. Deblocking and deringing are two video post-processing techniques used to remove coding artifacts and improve the visual quality when rendering low bit rate coded video. The techniques used to achieve these tasks are computationally intensive and usually require high speed processors to be able to run in real time.

The blocking effect is grid noise along block boundaries and is mainly visible in smooth areas with low motion. The blocking effect is produced by the quantization of direct current (DC) coefficients. Usually deblocking filters try to remove the unwanted boundaries between adjacent blocks by low-pass filtering pixels on both sides of the block borders. However, this type of filtering may introduce undesirable blurring effects when applied to pixels which belong to real image edges. The ringing effect shows along object borders and is primarily due to the quantization of alternating current (AC) coefficients.

SUMMARY OF THE INVENTION

The present invention advantageously provides methods and apparatus for removing ringing artifacts from video data. A deringing filter in accordance with the present invention preserves real image edges in a video frame, while smoothing out the interiors of objects. In one aspect, a 9-tap low-pass filter is applied to an adaptive processing window. The filter window is initialized with the values in a 3×3 mask centered on the position whose output is computed. Then, all values that are significantly different from the central value are replaced with the central value. The deringing filter varies between a 3×3 low-pass filter and an identity filter, depending on how much the central value differs from its surrounding values. The deringing method of the present invention detects image edges and applies a filter along these edges to eliminate the noise. The decision between edge and non-edge block borders relies on the assumption that real borders have a higher amplitude than edges produced by the quantization of DCT coefficients. A deblocking filter in accordance with the present invention may also be suitably used in conjunction with the deringing filter.

A more complete understanding of the present invention, as well as further features and advantages of the invention, will be apparent from the following detailed description and the accompanying drawings.

BRIEF DESCRIPTION OF THE DRAWINGS

FIG. 3 shows a deringing method in accordance with the present invention;

FIG. 4 shows a code sequence of a deringing filter in accordance with the present invention;

FIG. 5 shows a diagram of a video window for deblocking in accordance with the present invention;

FIG. 6 shows a flow chart of a deblocking method in accordance with the present invention;

FIG. 7 shows a code sequence of a deblocking filter in accordance with the present invention;

DETAILED DESCRIPTION

Figure 1:
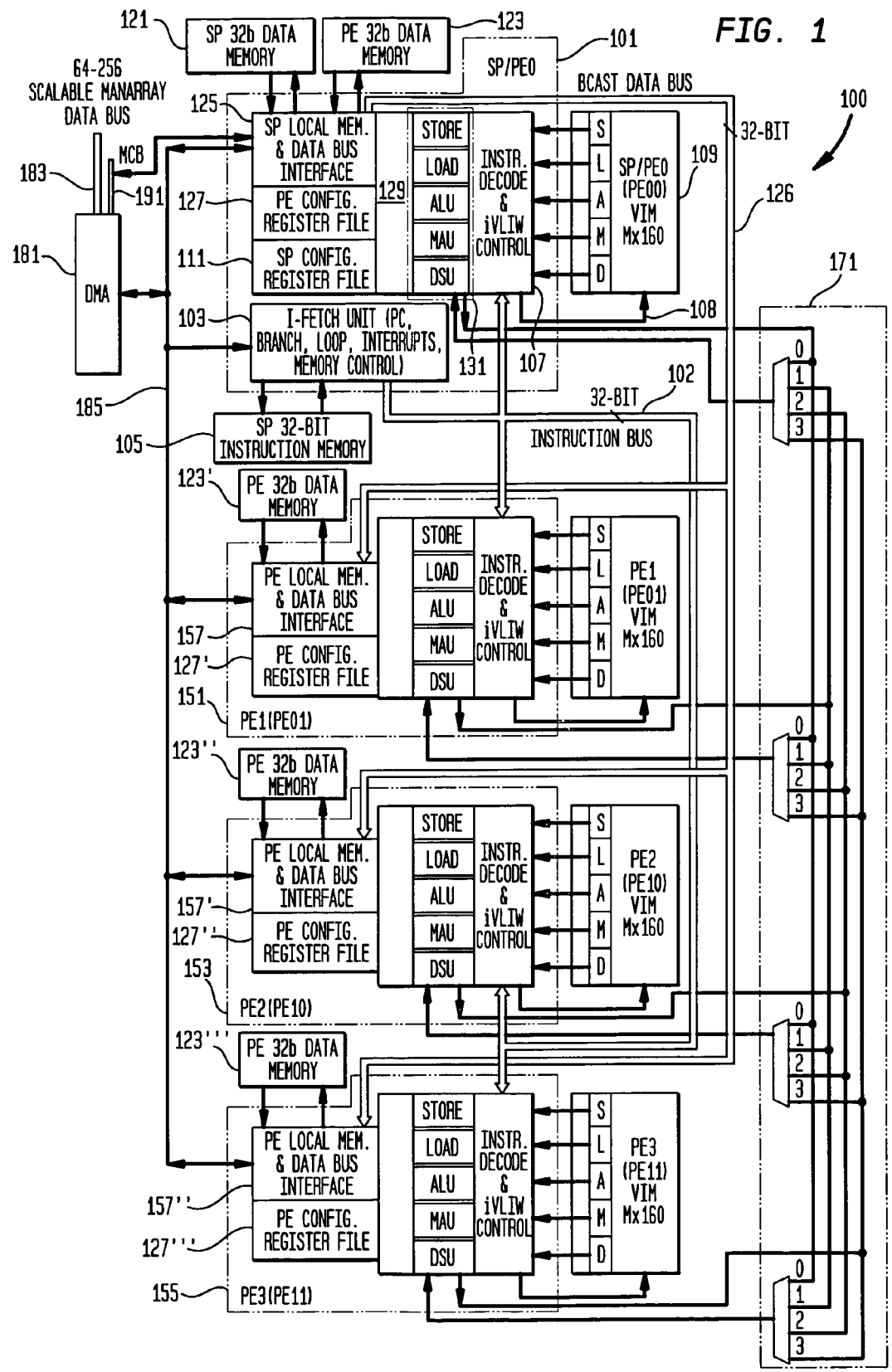
FIG. 1 illustrates an exemplary ManArray DSP and DMA subsystem appropriate for use with this invention.

The present invention now will be described more fully with reference to the accompanying drawings, in which several presently preferred embodiments of the invention are shown. This invention may, however, be embodied in various forms and should not be construed as limited to the embodiments set forth herein. Rather, these embodiments are provided so that this disclosure will be thorough and complete, and will fully convey the scope of the invention to those skilled in the art.

Further details of a presently preferred ManArray core, architecture, and instructions for use in conjunction with the present invention are found in:

U.S. patent application Ser. No. 08/885,310 filed Jun. 30, 1997, now U.S. Pat. No. 6,023,753;

U.S. patent application Ser. No. 08/949,122 filed Oct. 10, 1997, now U.S. Pat. No. 6,167,502;

U.S. patent application Ser. No. 09/169,256 filed Oct. 9, 1998, now U.S. Pat. No. 6,167,501;

U.S. patent application Ser. No. 09/1 69,255 filed Oct. 9, 1998, now U.S. Pat. No. 6,343,356;

U.S. patent application Ser. No. 09/1 69,072 filed Oct. 9, 1998, now U.S. Pat. No. 6,219,776;

U.S. patent application Ser. No. 09/187,539 filed Nov. 6, 1998, now U.S. Pat. No. 6,151,668;

U.S. patent application Ser. No. 09/205,5588 filed Dec. 4, 1998, now U.S. Pat. No. 6,173,389;

U.S. patent application Ser. No. 09/215,081 filed Dec. 18, 1998, now U.S. Pat. No. 6,101,592;

U.S. patent application Ser. No. 09/228,374 filed Jan. 12, 1999, now U.S. Pat. No. 6,216,223;

U.S. patent application Ser. No. 09/471,217 filed Dec. 23, 1999, now U.S. Pat. No. 6,260,082;

U.S. patent application Ser. No. 09/472,372 filed Dec. 23, 1999, now U.S. Pat. No. 6,256,683;

U.S. patent application Ser. No. 09/543,473 filed Apr. 5, 2000, now U.S. Pat. No. 6,321,322;

U.S. patent application Ser. No. 09/350,191, filed Jul. 9, 1999 now U.S. Pat. No. 6,356,994;

U.S. patent application Ser. No. 09/238,446, filed Jan. 28, 2999 now U.S. Pat. No. 6,366,999;

U.S. patent application Ser. No. 09/267,570, filed Mar. 12, 1999 now 6,446,190;

U.S. patent application Ser. No. 09/337,839 filed Jun. 22, 1999 now 6,839,728;

U.S. patent application Ser. No. 09/422,015, filed Oct. 21, 1999 now 6,408,382;

U.S. patent application Ser. No. 09/432,705, filed Nov. 2, 1999 now 6,697,427;

U.S. patent application Ser. No. 09/596,103, filed Jun. 16, 2000 now 6,397,324;

U.S. patent application Ser. No. 09/598,567, filed Jun. 21, 2000 now 6,826,522;

U.S. patent application Ser. No. 09/598,564, filed Jun. 21, 2000 now U.S. Pat. No. 6,622,234;

U.S. patent application Ser. No. 09/598,566, filed Jun. 21, 2000 now U.S. Pat. No. 6,735,690, U.S. patent application Ser. No. 09/598,558 filed Jun. 21, 2000;

U.S. patent application Ser. No. 09/598,084, filed Jun. 21, 2000 now U.S. Pat. No. 6,748,870;

U.S. patent application Ser. No. 09/599,980, filed Jun. 22, 2000 now U.S. Pat. No. 6,748,517;

U.S. patent application Ser. No. 09/711,218, filed Nov. 9, 2000 now U.S. Pat. No. 6,754,687;

U.S. patent application Ser. No. 09/747,056, filed Dec. 12, 2000 now U.S. Pat. No. 6,704,857;

U.S. patent application Ser. No. 09/853,989, filed May 11, 2001 now U.S. Pat. No. 6,845,445;

U.S. patent application Ser. No. 09/886,855 filed Jun. 21, 2001;

U.S. patent application Ser. No. 09/791,940, filed Feb. 23, 2001 now U.S. Pat. No. 6,834,295;

U.S. patent application Ser. No. 09/792,819 filed Feb. 23, 2001;

U.S. patent application Ser. No. 09/791,256 filed Feb. 23, 2001 now U.S. Pat. No. 6,842,811;

U.S. patent application Ser. No. 10/013,908 filed Oct. 19, 2001;

U.S. Serial application Ser. No. 10/004,010 filed Nov. 1, 2001;

U.S. application Ser. No. 10/004,578, filed Dec. 4, 2001 now U.S. Pat. No. 6,624,056;

U.S. application Ser. No. 10/116,221 filed Apr. 4, 2002;

U.S. application Ser. No. 10/119,660 filed Apr. 10, 2002;

U.S. application Ser. No. 10/131,941 filed Apr. 25, 2002;

Provisional Application Ser. No. 60/288,965 filed May 4, 2001;

Provisional Application Ser. No. 60/298,624 filed Jun. 15, 2001;

Provisional Application Ser. No. 60/298,695 filed Jun. 15, 2001;

Provisional Application Ser. No. 60/298,696 filed Jun. 15, 2001;

Provisional Application Ser. No. 60/318,745 filed Sep. 11, 2001;

Provisional Application Ser. No. 60/340,620 filed Oct. 30, 2001;

Provisional Application Ser. No. 60/335,159 filed Nov. 1, 2001 and

Provisional Application Ser. No. 60/368,509 filed Mar. 29, 2002, all of which are assigned to the assignee of the present invention and incorporated by reference herein in their entirety.

In a presently preferred embodiment of the present invention, a ManArray 2×2 iVLIW single instruction multiple data stream (SIMD) processor 100 as shown in FIG. 1 may be adapted as described further below for use in conjunction with the present invention. Processor 100 comprises a sequence processor (SP) controller combined with a processing element-0 (PE0) to form an SP/PE0 combined unit 101, as described in further detail in U.S. patent application Ser. No. 09/169,072 entitled "Methods and Apparatus for Dynamically Merging an Array Controller with an Array Processing Element". Three additional PEs 151, 153, and 155 are also labeled with their matrix positions as shown in parentheses for PE0 (PE00) 101, PE1 (PE01) 151, PE2 (PE10) 153, and PE3 (PE11) 155. The SP/PE0 101 contains an instruction fetch (I-fetch) controller 103 to allow the fetching of "short" instruction words (SIW) or abbreviated-instruction words from a B-bit instruction memory 105, where B is determined by the application instruction-abbreviation process to be a reduced number of bits representing ManArray native instructions and/or to contain two or more abbreviated instructions as described in the present invention. If an instruction abbreviation apparatus is not used then B is determined by the SIW format. The fetch controller 103 provides the typical functions needed in a programmable processor, such as a program counter (PC), a branch capability, eventpoint loop operations (see U.S. Provisional Application Ser. No. 60/140,245 entitled "Methods and Apparatus for Generalized Event Detection and Action Specification in a Processor" filed Jun. 21, 1999 for further details), and support for interrupts. It also provides the instruction memory control which could include an instruction cache if needed by an application. In addition, the I-fetch controller 103 controls the dispatch of instruction words and instruction control information to the other PEs in the system by means of a D-bit instruction bus 102. D is determined by the implementation, which for the exemplary ManArray coprocessor D=32-bits. The instruction bus 102 may include additional control signals as needed in an abbreviated-instruction translation apparatus.

In this exemplary system 100, common elements are used throughout to simplify the explanation, though actual implementations are not limited to this restriction. For example, the execution units 131 in the combined SP/PE0 101 can be separated into a set of execution units optimized for the control function; for example, fixed point execution units in the SP, and the PE0 as well as the other PEs can be optimized for a floating point application. For the purposes of this description, it is assumed that the execution units 131 are of the same type in the SP/PE0 and the PEs. In a similar manner, SP/PE0 and the other PEs use a five instruction slot iVLIW architecture which contains a VLIW instruction memory (VIM) 109 and an instruction decode and VIM controller functional unit 107 which receives instructions as dispatched from the SP/PE0's I-fetch unit 103 and generates VIM addresses and control signals 108 required to access the iVLIWs stored in the VIM. Referenced instruction types are identified by the letters SLAMD in VIM 109, where the letters are matched up with instruction types as follows: Store (S), Load (L), ALU (A), MAU (M), and DSU (D).

The basic concept of loading the iVLIWs is described in further detail in U.S. patent application Ser. No. 09/187,539 entitled "Methods and Apparatus for Efficient Synchronous MIMD Operations with iVLIW PE-to-PE Communication".

Also contained in the SP/PE0 and the other PEs is a common PE configurable register file 127 which is described in further detail in U.S. patent application Ser. No. 09/169,255 entitled "Method and Apparatus for Dynamic Instruction Controlled Reconfiguration Register File with Extended Precision". Due to the combined nature of the SP/PE0, the data memory interface controller 125 must handle the data processing needs of both the SP controller, with SP data in memory 121, and PE0, with PE0 data in memory 123. The SP/PE0 controller 125 also is the controlling point of the data that is sent over the 32-bit or 64-bit broadcast data bus 126. The other PEs, 151, 153, and 155 contain common physical data memory units 123', 123", and 123'" though the data stored in them is generally different as required by the local processing done on each PE. The interface to these PE data memories is also a common design in PEs 1, 2, and 3 and indicated by PE local memory and data bus interface logic 157, 157' and 157". Interconnecting the PEs for data transfer communications is the cluster switch 171 various aspects of which are described in greater detail in U.S. patent application Ser. No. 08/885,310 entitled "Manifold Array Processor", now U.S. Pat. No. 6,023,753, and U.S. patent application Ser. No. 09/169,256 entitled "Methods and Apparatus for Manifold Array Processing", and U.S. patent application Ser. No. 09/169,256 entitled "Methods and Apparatus for ManArray PE-to-PE Switch Control". The interface to a host processor, other peripheral devices, and/or external memory can be done in many ways. For completeness, a primary interface mechanism is contained in a direct memory access (DMA) control unit 181 that provides a scalable ManArray data bus 183 that connects to devices and interface units external to the ManArray core. The DMA control unit 181 provides the data flow and bus arbitration mechanisms needed for these external devices to interface to the ManArray core memories via the multiplexed bus interface represented by line 185. A high level view of a ManArray control bus (MCB) 191 is also shown in FIG. 1.

The present invention includes techniques for a deringing adaptive filter to reduce ringing noise in video processing. A deringing filter in accordance with the present invention may be suitably implemented on a computer processor, such as the system 100 described above. The deringing filter includes filtering masks which should include only pixels which are on the same side of an edge that needs to be preserved in order to prevent undesired blurring of image details. In addition, the deringing filter of the present invention may be suitably implemented on parallel processors which may not allow the use of data dependent jumps or calls. The visual quality obtained using the present deringing filter on very low bit rate sequences may be superior to the visual quality obtained by the MPEG4 filter.

Figure 2:
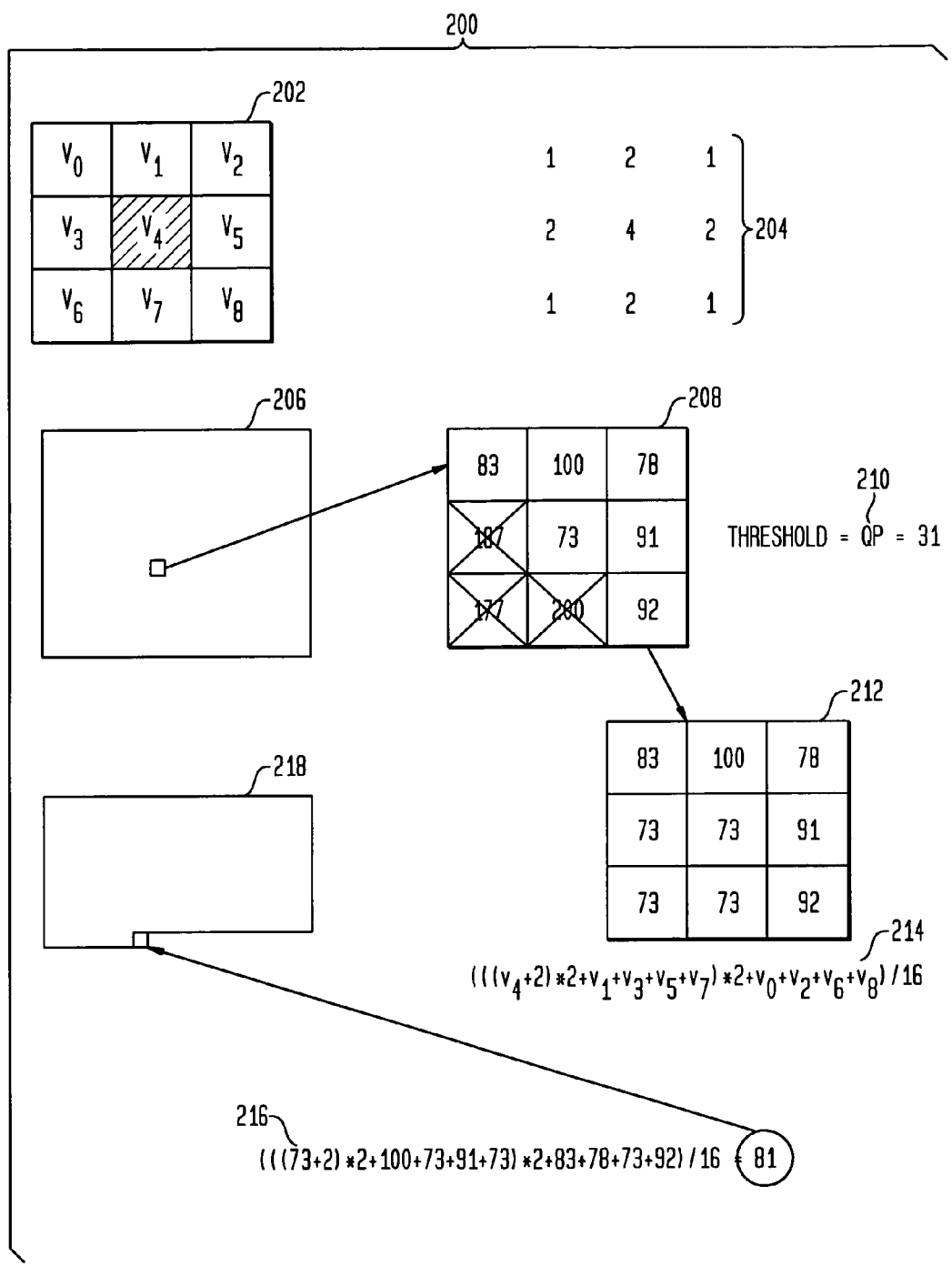
FIG. 2 illustrates a processing mask and filter coefficients in accordance with the present invention.

FIG. 2 shows a diagram 200 including a processing mask 202 and filter coefficients 204 in accordance with one aspect of the present invention. For each pixel of an original image to be processed, the 3×3 mask 202 having pixels $v_0$–$v_8$ is processed. Initially, the mask 202 includes a central pixel $v_4$ and eight neighboring pixels $v_0$–$v_3$ and $v_5$–$v_8$ from the original image. The absolute difference between the pixel $v_4$ and each of the pixel's eight neighbors is compared with a threshold value which is equal to a quantization parameter (QP). If the absolute difference is higher than the threshold value, the corresponding neighbor value of a pixel is replaced in the processing mask by the central value of pixel $v_4$. In such a case, it is assumed that the neighboring pixel does not belong to the same side of an image edge as the central pixel. Finally, a low pass filter is applied to the values in the processing mask to yield the resulting image. By replacing the values in the processing mask, the deringing filter varies between a low pass filter in which no value is replaced because no image edge is present in the mask, and an identity filter in which all differences are larger than the threshold and all values are replaced by the central value. FIG. 2 also illustrates an example of how the full procedure works. The original image in a block, such as block 206, is filtered with this procedure. For each pixel, at any position (i,j) within the image (i=1 . . . rows, j=1 . . . columns) the pixel's value and the values of its eight neighbors are extracted and fill the 3×3 processing mask. For the selected example, the 3×3 mask in block 208 is filled with the pixel's value (73), which is in $v_4$ position, and the values of its eight neighbors (83,100,78,187,91,177,200,92). Then the absolute difference between 73 and each of its eight neighbors is compared against a threshold (QP), which in this example is equal to 31, as illustrated by equation 210. Whenever the absolute difference is higher than the threshold, the respective neighbor value is replaced with the central value, which is 73. For this example, values 187, 177 and 200 in block 208 are replaced with value 73 in block 212. Expression 214 is used to calculate a resulting value. The variables in expression 214 $v_0$–$v_8$ are instantiated with values from block 212 and it becomes expression 216. The divide operation is an integer divide. The result of this expression 216 is 81, and this value is stored in the result image, block 218, in the position (i,j) corresponding to the selected pixel from the original image 206.

FIG. 3 shows a deringing method 300 in accordance with the present invention. In step 302, the filter input vector is calculated for each pixel $x_{i,j}$ in the input image (i=1, . . . cols, j=1, . . . rows). In step 304, the output $y_{i,j}$ is calculated for each pixel $x_{i,j}$ in the input image.

In a preferred embodiment, the image to be processed is divided into rectangular slices and each slice is separately processed by PEs working in SIMD mode. The slices are selected such that they contain an integer number of macroblocks, in a similar fashion to a deblocking filter technique described below. Data transfer, partitioning and program flow are performed in the background of the computation.

FIG. 4 illustrates a table 400 which shows an exemplary code segment for a deringing filter in accordance with the present invention. The filtering code is implemented in three nested loops in order to browse all vertical block borders and load the appropriate QP value for each border. An outer loop operates vertically on rows of blocks in the slice. A middle loop operates vertically on rows in a block (8 rows). As shown in table 400, an inner loop operates horizontally on the blocks in a row. Additional code segments for executing a deringing filter in accordance with the present invention are included in Appendix A and Appendix B.

For each PE, the input slices contain the additional bordering rows and columns needed in the computation. The present approach increases the amount of data transferred, but removes data dependencies between the PEs. The present approach may be suitably employed in such situations where the computation takes longer than the data transfer. The filtering may be advantageously achieved in a single pass. Eight output values are calculated on each PE in one pass through the inner computation loop. Packed data (8×8 bits or 4×16 bits data in 64 bits register pair) may be used. When the values of the input vector v are selected, the implementation may utilize instructions which are performed on packed 8×8 bit data. Additions, multiplies by 2 and shifts for division are used in the computation and the output is calculated as in the equation:

$$y=(((v_4+2)*2+v_1+v_3+v_5+v_7)*2+v_0+v_2+v_6v_8)/16$$

The code may be optimized for use with VLIWs. In a preferred embodiment, the method of the present invention consumes 96 cycles in the sequential implementation and only 36 cycles in the optimized implementation, with the VLIW efficiency factor being 2.67.

For an optimized implementation on each PE, the deringing filter loop takes 36 cycles for calculating eight output values. For one frame having horizontal and vertical dimensions H and V, the loop runs V*H/8 times for the deringing of luminance. The frame is divided and processed on four PEs, allowing the performance to scale linearly with the number of PEs utilized. If FPS denotes the frame rate, the theoretical lower bounds of the computation cycles for filtering the luminance on four PEs is ((V*H/8)*36*FPS)/4 cycles/sec, ignoring overhead such as DMA transfers and control flow instructions.

The deringing filter of the present invention may be suitably utilized in a system including a deblocking filter. For an image to be processed, the deblocking filtering is performed on both horizontal and vertical block borders. As seen in a diagram 500 of FIG. 5, for vertical deblocking an 8-pixel decision window $v_1$–$v_8$, perpendicular to the border and including equal number of pixels on both border sides, is used to calculate local features and select the filter type and coefficients.

The absolute differences between pairs of neighboring pixels are used to determine parameters, or feature values. The feature values are compared against thresholds based on the quantization parameter (QP). High values of the absolute differences indicate the presence of a real image edge which needs to be preserved. When a smooth region with no edges is indicated, a 7-tap low pass filter is used for calculating six values $v_2$–$v_7$, three on each side of the border, for strong smoothing. When an edge region is detected, but no abrupt change happens between the two neighboring pixels on each side of the border, a weak filter is applied, affecting only the two border pixels $v_4$ and $v_5$. No filtering is performed when a high absolute difference between the two border pixels $v_4$ and $v_5$ indicate the presence of an edge on that border. Horizontal deblocking is performed in the same manner as vertical blocking. A flow chart 600 of the deblocking method is shown in FIG. 6, in which exemplary values of Thr1 and Thr2 being 2 and 6, respectively, may be used.

In the deblocking method of the present invention, a frame is divided into rectangular slices, which are separately processed by the four PEs working in parallel. To unify all types of filters in a single procedure, values $v_2$–$v_7$ are calculated for each processing window using different sets of coefficients. The coefficients are selected from a table where they are indexed by the decision value. In the case of "No filter" decision and for four of the values for "Weak filter", an "Identity filter" is used.

FIG. 7 shows a code sequence 700 suitable for performing the deblocking filter in accordance with the present invention. In each pass through the filtering loop the six output values for a position of the processing window on block borders are calculated. Packed data (8×8 bits or 4×16 bits data in 64 bits register pair) may be used for the computation. Values $v_0, \ldots v_9$ are loaded into three registers and are used to calculate the decision index. Using this index, a pointer to a table for the coefficients of the six output values is obtained. Filtering may be advantageously achieved using a sum2p instruction and a shift instruction for normalization. The code sequence is optimized using VLIWs, which enable the five execution units to perform parallel instructions in the same cycle. In a preferred embodiment, the computation time is reduced by a factor of 2.65, from 106 cycles required by a sequential implementation to 40 cycles needed in the optimized one. 21 cycles are used for the decision and coefficients selection, and 19 cycles for the actual computation of the ouput values.

The filtering method of code sequence 700 is implemented in three nested loops in order to browse all vertical block borders and load for each border the appropriate QP value. An outer loop operates vertically on rows of blocks in the slice. A middle loop operates vertically on rows in a block (8 rows). An inner loop operates horizontally on the blocks in a raw.

The horizontal and vertical deblocking is achieved in two subsequent passes through the filtering procedure. In the first pass, data is filtered for vertical deblocking and stored as transposed with respect to the original order. In the second pass, the data is again filtered for vertical deblocking on the transposed order, which is equivalent to horizontal deblocking on the original order. The result is again stored as transposed with respect to the input, yielding the original order.

Figure 8:
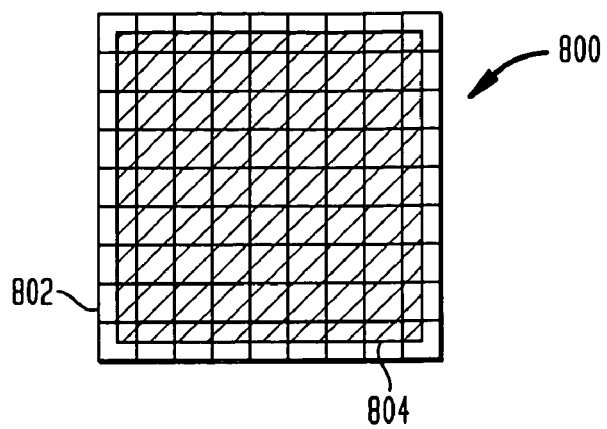
FIG. 8 illustrates a video block in accordance with the present invention.

The image slices processed by PEs are selected such that the slices contain an integer number of blocks. The input slice should include four additional border pixels on each side to be used for the computation. The input slices are bounded by block borders. In an exemplary video block 800 shown in FIG. 8 each input slice includes 81 blocks 802 arranged in a 9×9 fashion, with each block 802 comprising 64 pixels arranged in a 8×8 fashion. The result is calculated for the inner block borders and corresponds to the 64×64 (pixel) cross-hatched section 804 shown in FIG. 8. Four pixels comprise a border on each side of section 804.

Figure 9:
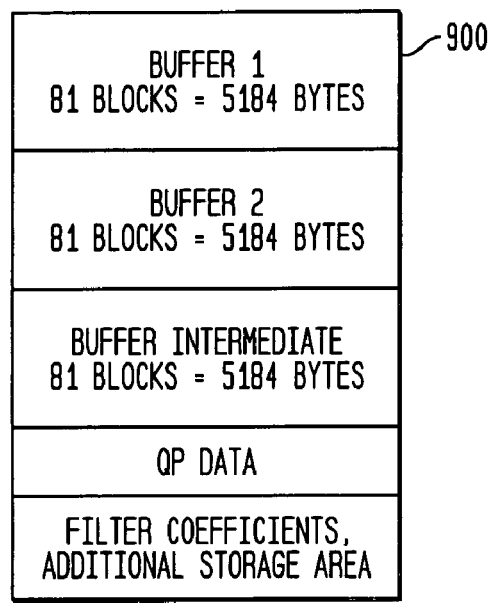
FIG. 9 shows a PE data memory map in accordance with the present invention.
Figure 10:
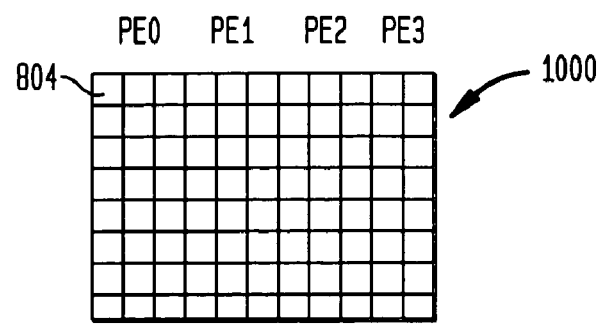
FIG. 10 shows a video frame in accordance with the present invention.

Initially, one slice of data is loaded into a PE data buffer, filtered for vertical deblocking and stored in transposed order in a second buffer. Then the second buffer is filtered and stored in transpose order back over the input. The result may then be transferred back to system memory, or SDRAM, and a new rectangular slice is loaded for processing. The techniques of the present invention enables overlap between data transfer to and from SDRAM and the computation. Three data buffers in PE data memory may used. Two of the data are used for loading input data and storing the result in an alternating fashion. The third buffer is used for the intermediate filtering result after the first pass through the deblocking filter. An exemplary PE data memory 900 is shown in FIG. 9. For deblocking one frame of luminance of SDTV size (704×480 bytes=88×60 blocks) the frame is divided in slices of 8×8 blocks. PE0, PE1 and PE2 process vertical areas of 3×8 slices, and the last PE processes an area of 2×8 slices, as shown in frame 1000 of FIG. 10.

Figure 11:
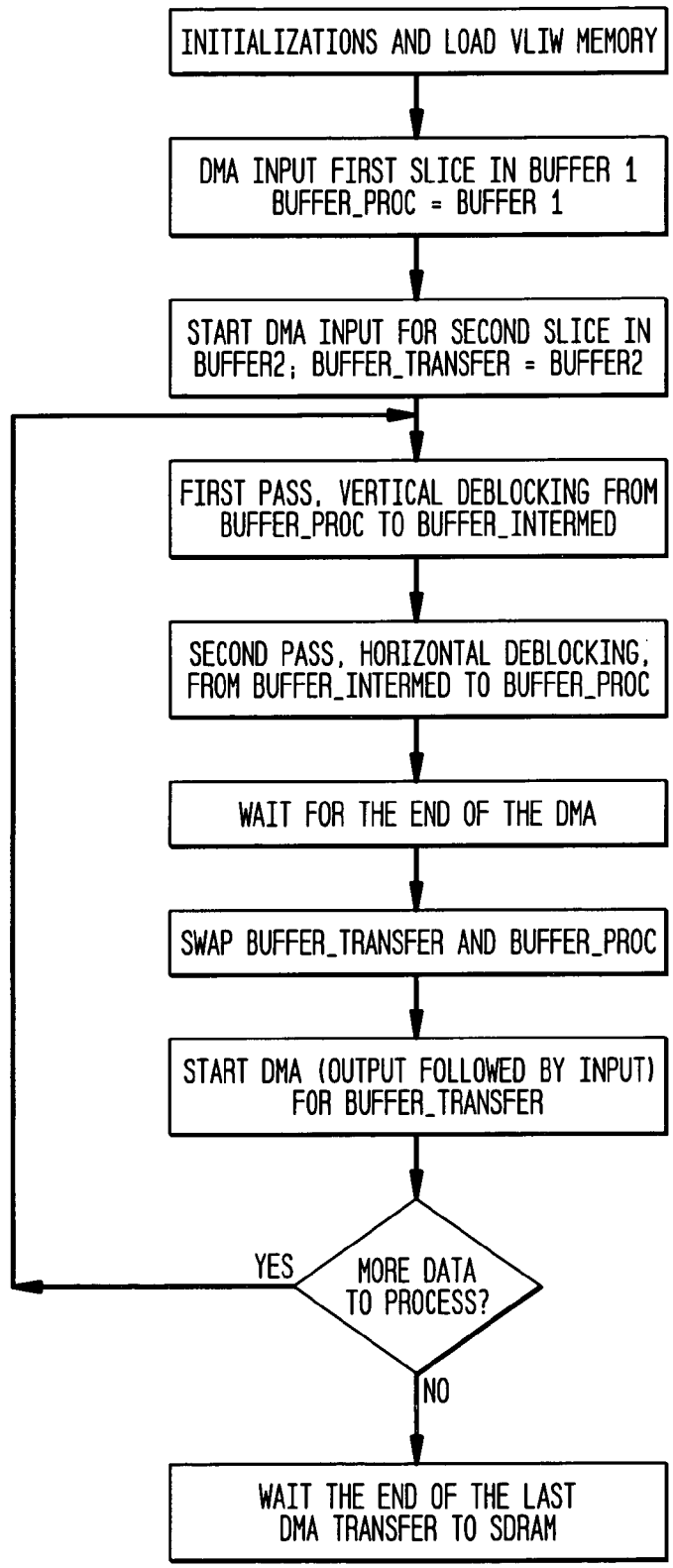
FIG. 11 shows a deblocking method in accordance with the present invention.

FIG. 11 shows a flow diagram of a deblocking method 1100 in accordance with the present invention. The design enables the data transfer between the SDRAM memory and a PE memory buffer (Buffer_Transfer) to take place while the computation is performed using two other buffers (Buffer_Proc and Buffer_Intermed). As described above, PE data memory is divided into three data buffers. Two of the buffers are alternately used for loading input data, and storing the result. The third buffer, denoted Buffer_Interm, is used for storing the intermediate filtering result after the first pass through the deblocking filter. One DMA channel is used for DMA output and input transfers, the data transfer time taking less than the actual processing. First the filtered data is transferred from Buffer_Transfer to SDRAM, then the buffer is filled with new data from the SDRAM. The only 'wait' states for the DMA to complete correspond to the first DMA transfer from SDRAM and the last DMA transfer to SDRAM. The data transferred from SDRAM into each PE memory include the rectangular slice and the additional boundary rows and columns needed in the computation. In the first pass, the bordering data needed for the second pass is also filtered.

It will be apparent to those skilled in the art that various modifications and variations can be made in the present invention without departing from the spirit and scope of the present invention. Thus, it is intended that the present invention cover the modifications and variations of this invention provided they come within the scope of the appended claims and their equivalents.

I claim:

1. A video processing method comprising the steps of:
   (a) selecting a mask area having a first pixel and a plurality of neighboring pixels;
   (b) determining an absolute difference between the value of the first pixel and the value of each of the plurality of neighboring pixels;
   (c) for each of the plurality of neighboring pixels, replacing the value of the neighboring pixel with the value of the first pixel, if the absolute difference is greater than a threshold value; and
   (d) applying a low pass filter to the first pixel and the neighboring pixels having the same value as the first pixel.

2. The video processing method of claim 1 wherein the threshold value is equal to a quantization parameter.

3. The video processing method of claim 1 wherein the first pixel and the plurality of neighboring pixels comprise a 3×3 array, and the first pixel is a center pixel of the array.

4. The video processing method of claim 3 wherein no values are replaced if an image edge is not present in the array.

5. The video processing method of claim 4 wherein the image edge is defined as a discontinuity larger than a threshold.

6. The video processing method of claim 3 wherein at least one value is replaced if an image edge is present in the array.

7. The video processing method of claim 1 wherein the mask area is selected from a video frame comprising additional pixel areas.

8. The video processing method of claim 7 wherein steps (a), (b), (c), and (d) are repeated to process the additional pixel areas.

9. The video processing method of claim 8 wherein steps (a), (b), (c), and (d) performed by a plurality of processing elements (PEs), each PE processing a portion of the video frame.

10. The video processing method of claim 9 wherein the PEs operate in single instruction multiple data (SIMD) mode.

11. A video processing apparatus comprising:
    (a) means for selecting a mask area having a first pixel and a plurality of neighboring pixels;
    (b) means for determining an absolute difference between the value of the first pixel and the value of each of the plurality of neighboring pixels; and
    (c) means for replacing the value of the neighboring pixel with the value of the first pixel, for each of the plurality of neighboring pixels, if the absolute difference is greater than a threshold value.

12. The video processing apparatus of claim 11 further comprising:
    (d) means for applying a low pass filter to the first pixel and the neighboring pixels having the same value as the first pixel.

13. The video processing apparatus of claim 11 wherein the threshold value is equal to a quantization parameter.

14. The video processing apparatus of claim 11 wherein the first pixel and the plurality of neighboring pixels comprise a 3×3 array, and the first pixel is a center pixel of the array.

15. The video processing apparatus of claim 14 wherein no values are replaced if an image edge is not present in the array.

16. The video processing apparatus of claim 14 wherein at least one value is replaced if an image edge defined as a discontinuity larger than a threshold is present in the array.

17. The video processing apparatus of claim 12 wherein the mask area is part of a video frame comprising additional pixel areas.

18. The video processing apparatus of claim 17 wherein the additional pixel areas are also processed.

19. A video processing apparatus comprising:
    (a) a plurality of processing elements (PEs); and
    (b) circuitry for communicatively connecting said processing elements;
    (c) said PEs operable to process a video image to remove image artifacts, each PE operating in parallel on a portion of the video image to select a mask area having a first pixel and a plurality of neighboring pixels, determine an absolute difference between the value of the first pixel and the value of each of the plurality of neighboring pixels, and replace the value of the neighboring pixel with the value of the first pixel, for each of the plurality of neighboring pixels, if the absolute difference is greater than a threshold value.

20. The video processing apparatus of claim 19 wherein each PE further operates to apply a low pass filter to the first pixel and the neighboring pixels having the same value as the first pixel.

21. The video processing apparatus of claim 19 wherein the threshold value is equal to a quantization parameter.

22. The video processing apparatus of claim 19 wherein the first pixel and the plurality of neighboring pixels comprise a 3×3 array, and the first pixel is a center pixel of the array.

23. The video processing apparatus of claim 19 wherein no values are replaced if an image edge is not present in the array.

24. The video processing apparatus of claim 19 wherein at least one value is replaced if an image edge defined as a discontinuity larger than a threshold is present in the array.

* * * * *